Patented Dec. 1, 1925.

1,563,613

UNITED STATES PATENT OFFICE.

CLINTON E. DOLBEAR, OF SAN FRANCISCO, CALIFORNIA.

METHOD OF SEPARATING SOLUBLE SALTS.

No Drawing.    Application filed December 17, 1923. Serial No. 681,296.

*To all whom it may concern:*

Be it known that I, CLINTON E. DOLBEAR, a citizen of the United States, residing at San Francisco, in the county of San Francisco and State of California, have invented certain new and useful Improvements in Methods of Separating Soluble Salts, of which the following is a specification.

My invention relates to methods of separating sodium chlorid, sodium carbonate and sodium sulfate (in the form of a mixed solid salt) from each other, and more particularly contemplates a procedure constituting an improvement on a certain portion of the process disclosed in an application filed by me October 20th, 1923, Serial Number 669,749.

The procedure disclosed in that application involves the extraction of potassium chlorid and borax from mixed salts (composed of chlorids, borates, carbonates, and sulfates of sodium and potassium) as a first step and followed by solution and subsequent separation from each other of the residual sodium chlorid, sulfate, and carbonate.

The subject-matter of the present case contemplates a change in the last mentioned step, and consists in subjecting the residual salts (after potassium chlorid and borax extraction) to the action of a partially saturated solution of sodium chlorid whereby all of the sodium carbonate and sodium sulfate are dissolved therefrom while the sodium chlorid is left undissolved.

This leaching solution should contain just sufficient sodium chlorid so that, when all of the sodium carbonate and sodium sulfate of the mixed salt are dissolved, the solution will be saturated with sodium chlorid. In other words, this solution should contain only that amount of sodium chlorid that, when all of the sodium carbonate and sodium sulfate of the mixed salts are dissolved, it will be in equilibrium with sodium chlorid in solid phase. In this reaction the unsaturated solution of sodium chloride will first take up salt and again deposit the same amount taken up when it reaches saturation with sodium carbonate and sulphate. The effect will be as if none of the sodium chloride of the mixed salts was dissolved. After thus leaching the mixed salts, the sodium chlorid remaining undissolved is separated from the solution by appropriate means, such (for example) as a centrifugal machine. The sodium chlorid, after being lightly washed, in the centrifuge, is pure and in condition to market.

The separated solution is next subjected to the action of carbon dioxid whereby sodium bicarbonate is formed and which (being almost insoluble in the solution of sodium chlorid and sodium sulfate) precipitates from the solution. This precipitated sodium bicarbonate is separated from the solution by appropriate means, such (for example) as a centrifugal machine; and, after lightly washing, is in pure condition and, after calcining, becomes soda ash of commerce.

The last separated solution will then contain very little other than sodium chlorid and sodium sulfate. It is next subjected to the action of a sodium-sulfate precipitant that is easily utilized and capable of strongly depressing the solubility of sodium sulfate without materially depressing the solubility of sodium chlorid, such (for instance) as ammonia or its equivalent for example methylamine or ethylamine. Substances suitable for use as a precipitant may be designated generally by the symbol $RNH_2$ in which $R=H$, or an alkyl group. I prefer, however, to use ammonia for this purpose, but these other substances may be used for the same purpose, if desirable. After sufficient ammonia has been absorbed by the solution to precipitate practically all of the contained sodium sulfate, the precipitated matter is separated from the solution by appropriate means, such (for instance) as a centrifugal machine. After lightly washing with warm water, the sodium sulfate is in pure anhydrous condition and ready for the market.

The separated solution will then contain principally sodium chlorid and ammonia: It is next treated in an ammonia still whereby the ammonia is driven off so as to be used for further precipitation of sodium sulfate from more sodium chlorid and sodium sulfate solution. The residual solution from the ammonia still is then used to dissolve more sodium sulfate from more of the mixed sodium chlorid, sodium carbonate, and sodium sulfate salt, thus completing the cycle.

If, for economic or other reason, it is desirable to recover the sodium carbonate alone from the mixed salt of sodium chlorid, sodium carbonate, and sodium sulphate, this salt can be leached in the same manner as above described but omitting the treatment with ammonia and using the residual solution after sodium bicarbonate separation for leaching the mixed salts. As this solution contains just the right proportion of both sodium chlorid and sodium sulfate to form a saturated solution of sodium chlorid, sodium sulfate and sodium carbonate—when all the sodium carbonate is dissolved from the amount of mixed salt used—no sodium chlorid or sodium sulfate will be dissolved therefrom and this solution—after again being subjected to the action of carbon dioxide and again separated from the resultant sodium bicarbonate,—can be used to dissolve more sodium carbonate from more mixed salts, and the cycle be repeated again and again.

What I clam is:

1. The process of separating sodium chlorid, sodium carbonate and sodium sulfate from each other comprising leaching the mixed salts with a solution of sodium chlorid; separating the undissolved residue from the solution; treating the solution with carbon dioxid; separating the precipitated sodium bicarbonate therefrom; treating the solution with ammonia; separating the precipitated sodium sulphate therefrom; distilling off the ammonia or its equivalent, and using the final liquor to dissolve more of the mixed salts in cycle as before.

2. The process of separating sodium chlorid, sodium carbonate and sodium sulfate from each other comprising leaching the mixed salts with a solution of sodium chlorid; separating the undissolved residue from the solution; treating the solution with carbon dioxid; separating the precipitated sodium bicarbonate therefrom; treating the solution with ammonia, separating the precipitated sodium sulphate therefrom; distilling off the ammonia, and using the final liquor to dissolve more of the mixed salts in cycle as before.

3. The process of separating sodium chlorid, sodium carbonate and sodium sulfate from each other comprising leaching the mixed salts with a solution of sodium chlorid; separating the undissolved residue from the solution; treating the solution with carbon dioxid; separating the precipitate sodium bicarbonate therefrom; treating the solution with a precipitant including a substance having the properties indicated by the symbol $RNH_2$ in which R equals H, or an alkyl group; separating the precipitated sodium sulfate therefrom; distilling off the precipitant; and using the final liquor to dissolve more of the mixed salts in cycle as before.

In testimony whereof I affix my signature.

CLINTON E. DOLBEAR.